United States Patent
Hanff et al.

[15] 3,698,820
[45] Oct. 17, 1972

[54] APPARATUS FOR MEASURING THE TRANSMISSIVE POWER OF THE ATMOSPHERE EMPLOYING TWO TRANSMITTERS AND RECEIVERS

[72] Inventors: Michel Max Hanff, Bailly; Stephane Chambolle, Paris, both of France

[73] Assignee: Compagnie des Compteurs, Paris, France

[22] Filed: Feb. 15, 1971

[21] Appl. No.: 106,672

[30] Foreign Application Priority Data

Jan. 19, 1970   France......................7001805

[52] U.S. Cl...................................356/206, 250/218
[51] Int. Cl.............................................G01n 21/22
[58] Field of Search.......356/206, 201, 205; 250/218

[56] References Cited

UNITED STATES PATENTS 3,419,333   12/1968   Towner.....................356/205

Primary Examiner—Ronald L. Wibert
Assistant Examiner—Orville B. Chew, II
Attorney—Pierce, Scheffler & Parker

[57] ABSTRACT

Process and device for measuring the transmissive power of the atmosphere wherein, on one hand, each transmitter is under control, so that the signals received from said transmitter by the associated respective receiver are kept at a constant value and, on the other hand, the signals having passed through the atmosphere and received from the remote transmitter, by each receiver, are applied to an operational circuit performing their half-sum, the output of which is characteristic of the transmissive power.

6 Claims, 3 Drawing Figures

APPARATUS FOR MEASURING THE TRANSMISSIVE POWER OF THE ATMOSPHERE EMPLOYING TWO TRANSMITTERS AND RECEIVERS

This invention relates to modifications and improvements brought to the device for measuring the transmissive power of the atmosphere, object of the French Pat. Applications No. PV 165 207, No. PV 179 985, No. 69 09 279.

The device, according to said Applications, is provided on each end of the measuring path, with an optical-electronic transmitter-receiver assembly, the two assemblies being identical and co-axial, means for separating the signals received by a receiver from its associated transmitter and by the remote transmitter and a circuit to perform the ratio of the products of homologous signals sent by each receiver. Said ratio is then proportional to the square of the transmissive power.

Consequently these arrangements require a computing circuit designed to perform, on one hand, the ratio of the above mentioned products, on the other hand, the extraction of the square root of said ratio to obtain the transmissive power.

The present invention simplifies the computation of the transmissive power by means of additional arrangements allowing to utilize for this computation, only the signals sent on the measuring path and based on the fact that on each of the measuring paths, the signals which are received and which are proportional to the transmissive power, have values very substantially close to an average value.

The device according to the invention is characterized by the fact that, on the one hand, each of the transmitters is under control so that the signals received from said transmitter through the associated receiver are kept at a constant value and that, on the other hand, the signals received from the remote transmitter by each receiver are applied to an operational circuit making their half-sum.

Under these conditions, the signals received by a receiver from the associated transmitter and kept at a constant value are only utilized to stabilize the emission level of said transmitter, while the signals received from the remote transmitter are the only ones which are utilized into the operational circuit which can be composed of only an operational amplifier of a standard type.

The invention will be better understood by referring to the following detailed description. Embodiment of the invention is shown by way of none restrictive example in the accompanying drawings in which.

Figure 1:
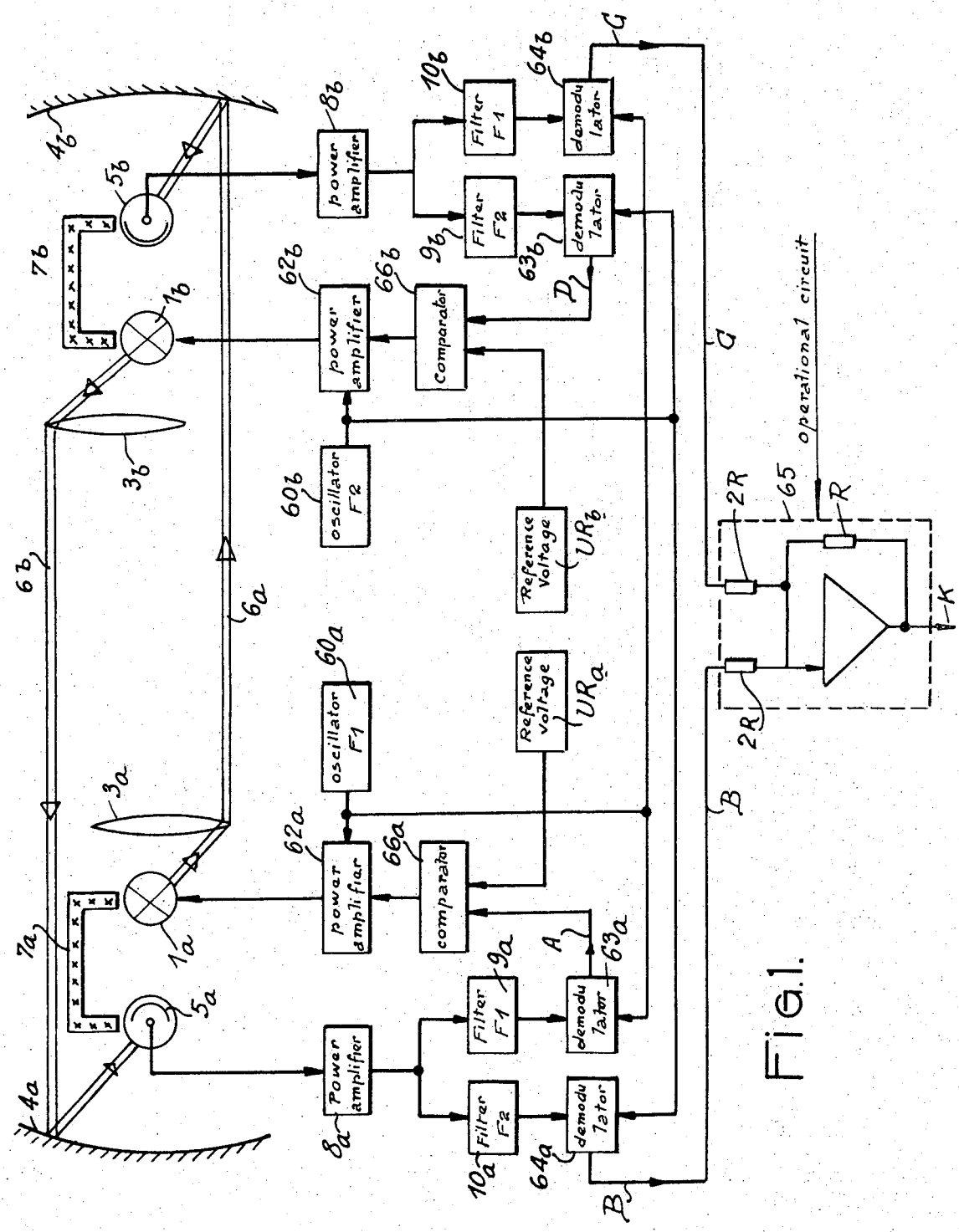
FIG. 1 is a diagrammatic embodiment of the invention.

Referring now to the drawings, the same references as in the above mentioned Patent Applications, have been kept, and the two transmitter-receiver assemblies have been shown respectively placed at each end of a measuring atmospheric path.

As shown on FIG. 1, at the two ends of an atmospheric path to be studied are placed two identical optical and electrical assemblies essentially composed of the transmitter-receiver elements $1a$, $5a$ and $1b$, $5b$ similar to the ones utilized in the above mentioned Patent Applications. The two radiation transmitters $1a$, $1b$ are respectively fed by power generators $2a$, $2b$ and they are placed behind convergent optics $3a$, $3b$. Each of the convergent mirrors $4a$, $4b$ picks up a determined portion of the radiation transmitted by the source of the opposite assembly. These mirrors send back the radiation onto the photosensible receivers $5a$ and $5b$ respectively. The mirrors $4a$, $4b$ and optics $3a$, $3b$ are pointed whereby the optical axis coincide, to obtain the maximal coupling between the source $1a$, and receiver $5b$, on one hand, and the source $1b$ and receiver $5a$ on the other hand. Consequently there are two beams of rays related to the atmospheric sample under study, one of the beams of rays being composed of rays such as $6a$, and the other beam of rays which is pointed to the opposite direction being composed of rays such as $6b$.

Units $7a$, $7b$ represent reference optical paths which are short and stable by realizing a low but constant coupling between source $1a$ and receiver $5a$, and between source $1b$ and receiver $5b$ respectively. Such units can be formed by an arrangement of plane mirrors or, more advantageously and as represented, by bunches of threads of glass called "optical fibers." Thus the bunches $7a$ and $7b$ respectively, return a part of the radiations sent from transmitter $1a$ and $1b$ respectively, directly to their associated receiver $5a$, $5b$ or through the spherical mirror $4a$ and $4b$ respectively.

The attention is called to the assembly shown on the left side of the FIG. 1; said assembly includes the radiation transmitter $1a$ fed form an oscillator $60a$ at a frequency $F_1$ through a controlled power amplifier $62a$ and the photosensitive receiver $5a$. The transmitter $1a$ is placed behind a convergent optics $3a$ in view of exciting, through the measuring optical path, the remote receiver $5b$ related to the second assembly.

A fraction of the radiations transmitted by source $1a$ is pointed towards the associated receiver $5a$, through a reference optical path $7a$, for example an optical fiber, realizing a constant optical coupling between these two elements. A convergent mirror $4a$ picks up a determined portion of the radiation transmitted by the source of the second assembly and sends back said radiation to the receiver $5a$. Said receiver $5a$ is followed by a power amplifier $8a$, by separating components composed of two filters $9a$, $10a$, of which one of said filters is tuned to the frequency $F_1$ of local oscillator $60a$ and the other filter to the frequency $F_2$ of the oscillator $60b$ of the remote assembly, and also by two demodulators $63a$, $64a$ connected respectively to local oscillator $60a$ and to the oscillator of remote assembly $60b$.

According to the invention, the output of demodulator $63a$ is connected to one of the inputs of a comparator $66a$ fed on the second input thereof by a reference voltage $URa$ and the output of said comparator is connected to the gain control of amplifier $62a$.

Besides, the output of demodulator $64a$ is connected to one of the inputs of an operational circuit $65$ having a second input connected to the output of homologous demodulator $64b$ of the other assembly.

At the output of said circuits assembly there are four different electrical signals A, B, C, D respectively appearing on the demodulators $63a$, $64a$ and $63b$, $64b$.

The following is so designated:

$E_1$ and $E_2$ are the powers radiated by the sources $1a$ and $1b$ respectively.

$O_1$ and $O_2$ the respective transmission coefficients of optics $3a$ and $3b$.

$M_1$ and $M_2$ the respective retransmission coefficients of the mirrors $4a$ and $4b$.

$S_1$ and $S_2$ the respective sensitiveness of receivers $5a$ and $5b$.

$R_1$ and $R_2$ are the respective transmission coefficients of reference units $7a$ and $7b$.

$G_1$ and $G_2$ are the respective gains of amplifiers $8a$ and $8b$.

$K$ the transmissive power of the atmosphere for the considered atmospheric path.

Besides, it is assumed that separative elements or filters $9a$, $9b$, $10a$ and $10b$, do not introduce any sensible alteration of the electrical signals they have to transmit, which can easily occur when electrical filters are utilized as separative elements.

The different signals A, B, C and D have the following values:

$A = E_1 R_1 S_1 G_1$
$B = E_2 S_1 O_2 M_1 K G_1$
$C = E_1 S_2 O_1 M_2 K G_1$
$D = E_2 R_2 S_2 G_2$

The comparator $66a$ sends at the output thereof a signal which is proportional to the difference between signal A and the reference voltage $UR_a$ and sends signal operating on the gain of amplifier $62a$ in a way to constantly remove said difference. The amplifier $62a$ is thus servoed.

To this end, the comparator $66a$ can be composed of a differential amplifier sending a signal proportional to the algebraic difference of the signals A and $UR_1$ applied a the input of the same.

The operating point of amplifier $62a$ is designed to obtain $UR_a = A$, the output of comparator $66a$ being zero; A being defined by the characteristics of other parameters ($7a$, $5a$, $8a$) which intervene in the expression thereof according to the above formula. When the value of A varies, the operating point of amplifier $62a$ is modified under the effect of the differential voltage $A - UR_a$ or $UR_a - A$, whereby the resultant gain variation returns, through the servo, the value of A to the reference value $UR_a$. Thus, the amplifier $62a$ ensures the emission level of source $1a$. The result is that term A is constant and that in the second assembly it is the same for the term D.

Moreover, since the coefficients $R_1$ and $R_2$ are also constant by construction, the products $E_1 S_1$ and $E_2 S_2$ are also constant, in assuming that the gains $G_1$ and $G_2$ of amplifier $8a$ and the homologue thereof do not vary.

Consequently the product $B \times C$ can be simplifier into $B \times C = $ constant $\times K^2$, the constant being equal to $E_1 S_1 \cdot E_2 S_2 \cdot G_1 G_2 \cdot O_2 M_1 O_1 M_2$.

So, with no consideration to the constant, $K = \sqrt{B \cdot C}$. Besides, because of the construction of the device B and C are very close to each other, the computation shows that it is possible, with a very acceptable approximation, to consider as $K$ the value $B \times C/2$. In these conditions, the operational circuit 65 performs this half-sum, the signals B and C being, for example, applied through resistances of value $2R$ and the counter-reaction circuit having a resistance of value $R$.

In performing separated measures on each channel, for the two signals B and C, very close values must be found. For that purpose, first must be individually excited the source $1a$ at frequency $F_1$ and at output of demodulator $64b$ is obtained the signal C which is measured. Then is individually excited the source $1b$ at frequency $F_2$ and at output of demodulator $64a$ is obtained the signal B which is measured.

These two signals having to be approximately equal because of the symmetry of the two channels of the device, their disparity allows to deduce the existence of a trouble on one of the channels.

Consequently, if the two signals B and C have not very close values, it can be assumed that probably there is a modification in the constant of proportion, taking into consideration the transmission coefficients of the optics, such modifications can result from a dirty optical element. The comparison made between the two signals thus indicates the requirement of cleaning.

Figure 2:
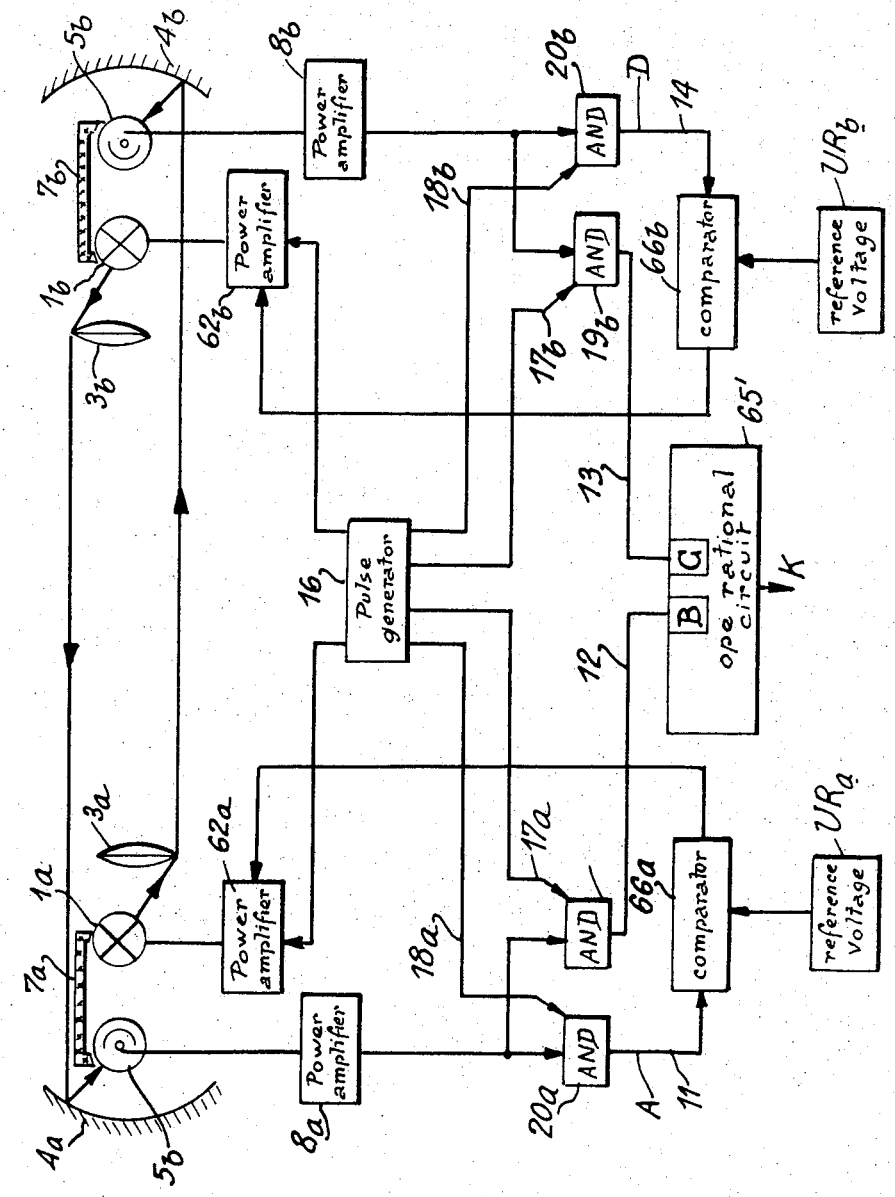
FIG. 2 is a variant of the embodiment shown on FIG. 1.
Figure 3:
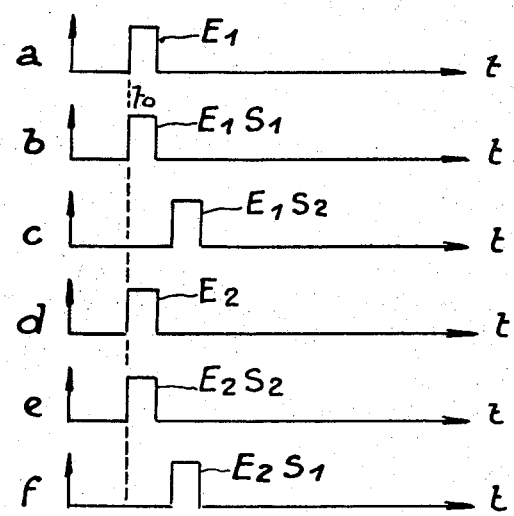
FIG. 3 is an explanatory diagram.

In another particular embodiment of the invention shown in FIG. 2, the assemblies $1a$, $1b$ are electroluminescent diodes which are fed by pulse generators. The duration of the pulses is less than the time taken by light for traversing the atmospheric path studied. In this figure, where the same members as those of FIG. 1 have the same reference numerals, a short pulse generator 16 simultaneously feeds the electric power amplifiers $62a$ and $62b$ connected to the electroluminescent diodes $1a$ and $1b$. The power pulses $E_1$, $E_2$, then radiated by the diodes $1a$ and $1b$, are shown on FIG. 3, lines $a$ and $d$.

The current pulse $E_1 S_1$, delivered by the receiver $5a$ under the energizing of the radiation of the diode $1a$, is shown on line $b$. It is practically simultaneous with the pulse $E_1$, line $a$. On the contrary, the current pulse delivered by the receiver $5b$, under the influence of the diode $1a$, is offset by the time taken by the light to traverse the atmospheric path as shown at $E_1 S_2$, line $c$.

The lines $e$ and $f$ show that the same phenomenon takes place with regard to the power pulses transmitted by the electroluminescent diode $1b$.

Each of the receivers $5a$, $5b$ thus successively delivers two pulses, shown by $E_1 S_1$ (line $b$) and $E_2 S_1$ (line $f$) for the receiver $5a$, by $E_2 S_2$ (line $e$) and $E_1 S_2$ (line $c$) for the receiver $5b$. The separation of these signals is done by two groups of two electronic switches or gate circuits, for instance, the circuits AND $19a$, $20a$, $19b$, $20b$, which are piloted by the pulse generator 16 in such manner that the four sought signals A, B, C, D as above mentioned appear each individually on the conductors 11, 12, 13, 14.

The signals A and D available at output of gates $20a$ and $20b$ are utilized, as previously to return them to their reference value; comparators $66a$ and $66b$ determine the gain of amplifiers $62a$ and $62b$, the input signals of said amplifiers are sent through generator 16 at instant to. Besides, the signals B and C simultaneously available at the output of gates $19a$ and $19b$, are applied onto an operational circuit $65'$ to obtain their average value.

The invention relates to the visibility measurement of radiative objects or sources, especially to ground-lights on aerodrome tracks.

We claim:

1. A device for measuring the transmissive power of the atmosphere between two points determining a measuring path comprising two light transmitters, at least one of them being placed at one of the points to send a light signal to the other point through the atmosphere under study and the transmissive power of which is to be measured ; two receivers, one of them at least receiving the light signal having been sent through the atmosphere ; a set of optical paths independent of the atmosphere under study and optically connecting the receivers to the respective transmitters whereby each receiver receives two data, at least one of them being applied through one of the optical paths independent of the atmosphere ; means to separate the two data received by each receiver connected thereto to differentiate the data sent to each of them through the optical paths independent of the atmosphere from the one having passed through the atmosphere ; and wherein on one hand, each transmitter is under control so that the signals received from said transmitter by the associated respective receiver are kept at a constant value and on the other hand, the signals having passed through the atmosphere and received from the remote transmitter, by each receiver, are applied to an operational circuit performing their half-sum the output of which is characteristic of the transmissive power.

2. Device as set forth in claim 1, comprising two identical transmitter-receiver units which are respectively arranged at said two points determining the measuring path, an optical circuit insulated from the atmosphere under study provided for connecting the transmitter to the receiver of each unit, an optical system associated with each unit for sending a light signal coming from each transmitter of each unit on to the receiver of the other unit, at least one modulated power generator connected to said transmitters for feeding said transmitters, so that each receiver receives direct information from the transmitter to which it is connected and an information having traversed the atmosphere, two sets of two separating devices respectively connected to each receiver for separating the signals received in two distinct data and apply the data to said operational circuit.

3. Device as set forth in claim 2, comprising two electric power generators modulated at different frequency for feeding each transmitter, and frequency filters for forming said separating devices.

4. Device as set forth in claim 2, comprising an electric power pulse generator, whose period is of duration less than the time required for the light to go form one point to the other, directly connected to each transmitter, and two sets of two gate circuits respectively connected to said two receivers, to said pulse generator and said operational circuit for forming said separating device of data brought to this operational circuit.

5. Device as set forth in claim 1 in which each transmitter-receiver unit if formed by an electroluminescent diode optically coupled with a junction photo-detector.

6. Device as set forth in claim 1 in which the optical paths insulated from the atmosphere to be studied are formed by at least one optical fiber.

* * * * *

UNITED STATES PATENT OFFICE
CERTIFICATE OF CORRECTION

Patent No. 3,698,820  Dated October 17, 1972

Inventor(s) Michel Max Hanff et al.

It is certified that error appears in the above-identified patent and that said Letters Patent are hereby corrected as shown below:

On the cover sheet (22) "Filed: Feb. 15, 1971" should read -- Filed: Jan. 15, 1971 --. Claim 5, line 2, "if" should read -- is --.

Signed and sealed this 8th day of May 1973.

(SEAL)
Attest:

EDWARD M. FLETCHER, JR.
Attesting Officer

ROBERT GOTTSCHALK
Commissioner of Patents